May 30, 1961 G. W. KILLIAN 2,986,605

TRUNK FINDER

Filed Nov. 7, 1957 2 Sheets-Sheet 1

INVENTOR.
GEORGE W. KILLIAN
BY George J. Seligsohn
ATTORNEY

May 30, 1961 G. W. KILLIAN 2,986,605

TRUNK FINDER

Filed Nov. 7, 1957 2 Sheets-Sheet 2

United States Patent Office 2,986,605
Patented May 30, 1961

2,986,605

TRUNK FINDER

George W. Killian, Rochester, N.Y., assignor to General Dynamics Corporation, Rochester, N.Y., a corporation of Delaware Filed Nov. 7, 1957, Ser. No. 695,115

5 Claims. (Cl. 179—27)

This invention relates to telephone systems, and more particularly to an improved trunk finder.

In many telephone exchanges some of the selector levels are dead, i.e., unused, and some of the lines are unassigned or otherwise out of service. Since a subscriber may dial a dead selector level or an unassigned line, it is desirable that in such a situation the subscriber be connected with an intercept operator. Thus, as well known in the art, dead levels of selectors and unassigned line terminals of connectors are connected to intercept line circuits having access to means for extending the connection to an intercept operator.

In the case of an unattended exchange, the connection must be extended to an operator at a distant office over a trunk. Where there is sufficient intercept traffic to the operator to justify a plurality of trunks, it is necessary to provide a plurality of trunk finders, each of which has access to each of the plurality of trunks. Each trunk finder, in turn, is individually connected to an intercept line finder which is pre-allotted and which has access to all or at least a group of dead levels of one or more selectors and unassigned line terminals of one or more connectors.

It is an object of this invention to provide an improved trunk finder of the type above-described which incorporates multi-function means to thereby reduce the cost and complexity thereof.

Figure 1:
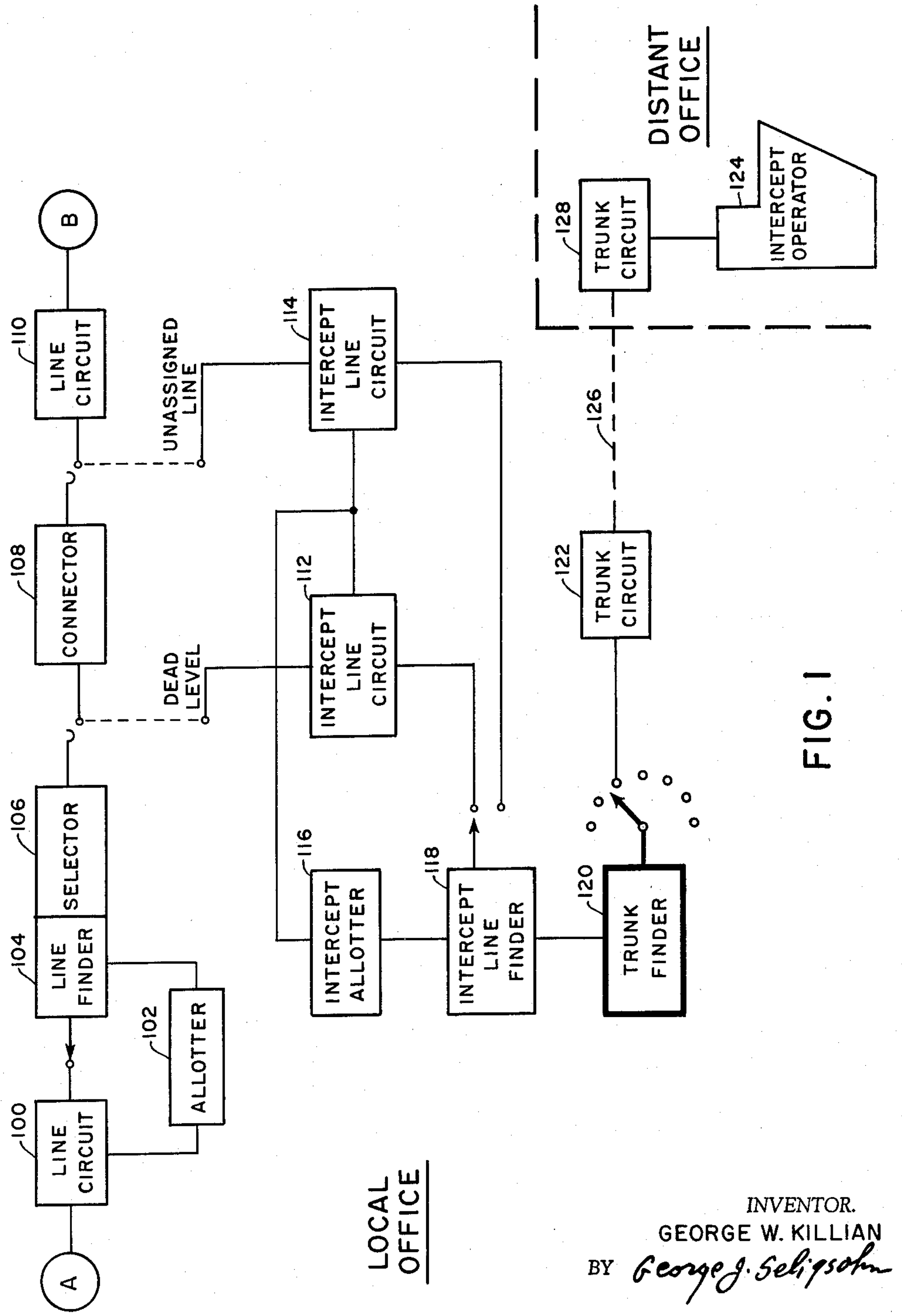
Figure 2:
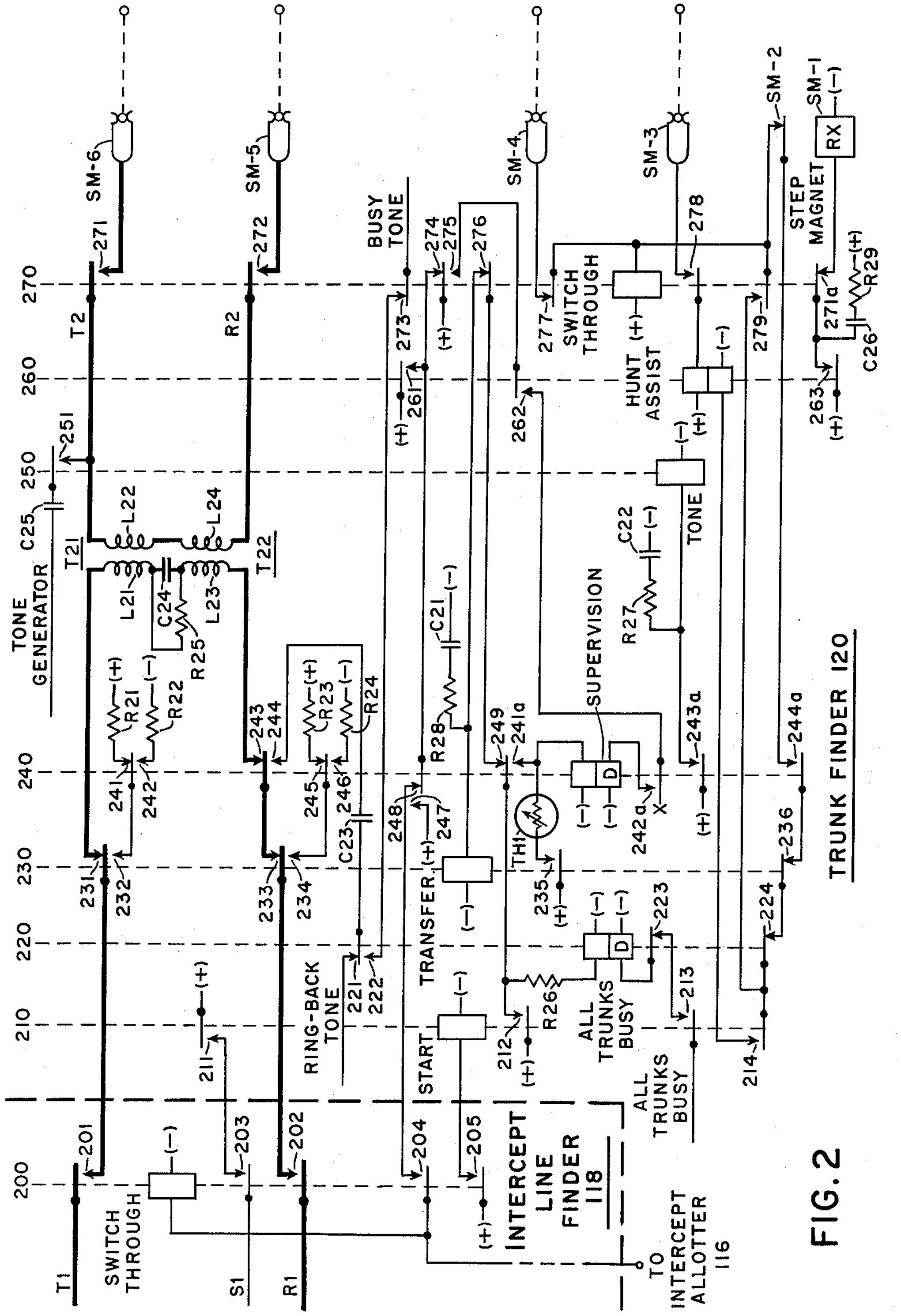

This and other objects and attendant advantages of the present invention will be better understood from the following detailed description taken together with the accompanying drawing, in which:

Fig. 1 is a block diagram of a telephone system employing the trunk finder of the present invention, and Fig. 2 is a schematic showing of the improved trunk finder and a pertinent portion of the preceding line finder of the present invention.

Referring now to Fig. 1, in response to a call initiated by subscriber A, line circuit 100 individual to subscriber A causes allotter 102 to operate line finder 104, which is previously allotted by allotter 102, to find line circuit 100, and thereby extend a connection from line circuit 100 to line finder 104 to thereby seize selector 106 which is individual to line finder 104. Selector 106 has access to a plurality of connectors such as connector 108. Assuming subscriber A dials the proper digit, the switch of selector 106 is operated to further extend the connection from selector 106 to connector 108, which is seized thereby. Assuming further that subscriber A dials the proper additional digits, the switch of connector 108 is operated to further extend the connection to subscriber B through line circuit 110 individual thereto. Connector 108 then applies ringing current to the telephone of subscriber B and, in response to subscriber B answering, a talking path is established between calling subscriber A and called subscriber B, all in a manner well known in the art.

Assume now however that subscriber A should dial a wrong digit which causes the switch of selector 106 to operate to a dead level thereof, i.e., a level which is not connected to a connector. In this case, a connection is extended to an intercept line circuit, such as intercept line circuit 112. In a similar manner, should subscriber A dial a wrong additional digit which causes the switch of connector 108 to operate to an unassigned or troubled line, a connection is also extended to an intercept line circuit, such as intercept line circuit 114.

In response to a connection being extended to one of the intercept line circuits, a start signal is applied therefrom to intercept allotter 116, which causes intercept allotter 116 to operate intercept line finder 118, which is pre-allotted by intercept allotter 116, to find the intercept line circuit to which the connection has been extended. When this intercept line circuit has been found, the connection is further extended through intercept line finder 118 to trunk finder 120 which is individual thereto, to thereby seize trunk finder 120.

Trunk finder 120, in which the present invention resides, in response to seizure thereof, first returns a signal which is effective in tripping ringing in connector 108, if the connection is extended through intercept line circuit 114. If the connection is extended through intercept line circuit 112, this return signal is without effect.

After return of this ring trip signal, ringback tone is returned to the calling subscriber and simultaneously therewith a busy test is made on the trunk circuit which is connected to trunk finder 120 through the rotary switch thereof, such as trunk circuit 122. In response to a busy marking being returned from trunk circuit 122, trunk finder 120 will normally operate the rotary switch thereof to switch to the next trunk circuit. However, if all trunk circuits are busy, trunk finder 120 will not operate the rotary switch thereof, but, instead will substitute busy tone for the ringback tone being returned to the calling subscriber.

Assume, however, that trunk circuit 122 is idle. In this case trunk circuit 122 will be seized by trunk finder 120, thereby extending a connection from trunk circuit 122 to intercept operator 124 at a distant office over trunk line 126 and through trunk circuit 128 of the distant office. Simultaneous with seizure of trunk circuit 122, a tone signal from trunk finder 120, indicative of a waiting call, is forwarded by trunk finder 120 to intercept operator 124 through trunk circuit 122, trunk 126 and trunk circuit 128.

When the intercept operator answers, an answer supervision signal is returned to trunk finder 120. In response to the return of this answer supervision signal, trunk finder 120 removes this tone to the intercept operator and ringback tone to the calling subscriber, and simultaneously effects the establishment of a talking path between the calling subscriber and the intercept operator.

In order to better understand the manner in which trunk finder 120 performs the above-described functions, reference will now be made to Fig. 2, which shows in detail the structure thereof as well as a pertinent portion of intercept line finder 118.

In response to intercept line finder 118 finding the intercept line circuit through which the call is extended, switchthrough relay 200 thereof is operated by a ground applied thereto from intercept allotter 116. In response to the operation of switchthrough relay 200, normally open contacts 201, 202, 203, 204 and 205 thereof are closed. The closure of contacts 204 applies a holding ground for switchthrough relay 200 from trunk finder 120 over a connection extending from ground through normally closed contacts 274 and 248, operated contacts 204 and switchthrough relay 200 to grounded battery. Immediately after the operation of switchthrough relay 200, intercept allotter 116 steps-off line finder 118, removing the original operating ground for switchthrough relay 200, thereby placing the continued operation of switchthrough relay 200 under the control of the holding ground from trunk finder 120 applied thereto through operated contacts 204 thereof.

In response to the closure of contacts 205, start relay 210 of trunk finder 120 is operated over a connection extending from ground through operated contacts 205 and start relay 210 to grounded battery. In response to the operation of start relay 210, normally open contacts 211, 212, 213, and 214 thereof are closed. The closure of contacts 211 applies ground to the sleeve conductor of line finder 118 through operated contacts 211 and 203. This ground on the sleeve conductor of line finder 118 is further extended to the intercept line circuit through which the call is extended to mark this intercept line circuit as busy to other calls. The closure of contacts 212 applies operating ground to transfer relay 230 over a connection extending from ground through operated contacts 212, normally closed contacts 249 and 276 and transfer relay 230 to grounded battery. Transfer relay 230 is shunted by an arc suppressing network composed of resistance 28 and capacitance 21. The closure of contacts 212 also effects the energization of the upper winding of all trunks busy differential relay 220 over a connection extending from ground through operated contacts 212, resistance 26 and the upper winding of all trunks busy differential relay 220 to grounded battery.

The closure of contacts 213 connects the all trunks busy conductor to the lower winding of all trunks busy differential relay 220 over a connection extending through operated contacts 213, normally closed contacts 223 and the lower winding of all trunks busy differential relay 220 to grounded battery. As well known in the art, so long as at least one of the trunk circuits is not busy, ground is applied to the all trunks busy conductor. Therefore, all trunks busy differential relay 220 operates through its upper winding only if all trunks are busy, otherwise the differential energization of its lower winding prevents it from operating. In response to the operation of all trunks busy differential relay 220, normally closed contacts 221, 223 and 224 thereof are opened and normally open contacts 222 thereof are closed.

The operation of transfer relay 230 in response to the closure of contacts 212, described above, results in normally closed contacts 231, 233 and 236 thereof being opened and normally open contacts 232, 234 and 235 thereof being closed.

The closure of contacts 232 applies resistance ground to the T1 conductor over a connection extending from ground through resistance R21, normally closed contacts 241, and operated contacts 232 and 201; and the closure of contacts 234 applies resistance ground to conductor R1 over a connection extending from ground through resistance R23, normally closed contacts 245, and operated contacts 234 and 202. In a manner well known in the art, these resistance grounds extended to the tip and ring conductors are effective in tripping ringing in connectors in which the ring trip means is connected to grounded battery.

In response to the closure of contacts 235, ground is applied to the upper winding of supervision differential relay 240 over a connection extending from ground through operated contacts 235, time delay thermistor TH1 and the upper winding of supervision differential relay 240 to grounded battery. After a time determined by the time delay characteristics of time delay thermistor TH1, supervision differential relay 240 operates to open normally closed contacts 241, 243, 245, 248 and 249 thereof and to close normally open contacts 242, 244, 246, 247, **241*a*, 242*a*, 243*a* and 244*a*** thereof.

The opening of contacts 241 and 245 and the simultaneous closing of contacts 242 and 246 substitutes resistance battery, through resistances R22 and R24, respectively, for resistance ground on tip and ring conductors T1 and R1, respectively. The resistance battery on these conductors is effective in tripping ringing in connectors in which the ring trip means is connected to ground, in a manner well known in the art.

The closure of contacts 247 applies an alternate holding ground for switchthrough relay 200 and the opening of contacts 248 removes the original holding ground therefor through normally closed contacts 274. However, since, as shown, contacts 247 and 248 form make-before-break contacts the holding ground for switchthrough relay 200 is maintained continuously.

The opening of contacts 249 breaks the above described operating path for transfer relay 230. In response thereto transfer relay 230 restores.

If all trunks are busy, busy tone is returned to the calling subscriber over a connection extending from the busy tone conductor through normally closed contacts 273, operated contacts 222, capacitance C23, operated contacts 244, normally closed contacts 233 and operated contacts 202 to ring conductor R1; otherwise, ringback tone is returned to the calling subscriber over a connection extending from the ringback tone conductor through normally closed contacts 221, capacitance C23, operated contacts 244, normally closed contacts 233 and operated contacts 202 to ring conductor R1.

In response to the closure of contacts **243*a*, tone relay 250 is operated over a connection extending from ground through operated contacts 243*a* and tone relay 250. Tone relay 250 is shunted by an arc suppressing network consisting of resistance R27 and capacitance C22. In response to the operation of tone relay 250, normally open contacts 251** thereof are closed.

Assuming that all the trunks are not busy, but that trunk circuit 122 is busy, hunt assist relay 260 will be operated by a busy marking ground returned from trunk circuit 122 on conductor S2 over a connection extending from conductor S2 through normally closed contacts 277, normally closed interrupter contacts SM–2, operated contacts **244*a*, normally closed contacts 236 and 224, operated contacts 214 and the lower winding of hunt assist relay 260** to grounded battery.

In response to the operation of hunt assist relay normally open contacts 261, 262 and 263 thereof are closed. In response to the closure of contacts 263, which are shunted by an arc suppressing network consisting of capacitance C26 and resistance R29, an energization path for step magnet SM–1 of a rotary switch is energized over a connection extending from ground through operated contacts 263, normally closed contacts **271*a* and step magnet SM–1 to grounded battery. In response to the energization of step magnet SM–1, interrupter contacts SM–2 thereof are opened, thereby breaking the above-described operating path for hunt assist relay 260. Therefore, hunt assist relay 260 restores, opening contacts 263** thereof, thereby breaking the energization path for step magnet SM–1. In response to the deenergization of step magnet SM–1, wipers SM–3, SM–4, SM–5 and SM–6 of the rotary switch controlled thereby are stepped to the terminals of the next trunk circuit. If this trunk circuit is also busy, the process is repeated until an idle trunk circuit is reached.

Assume now that trunk circuit 122 is idle. In this case busy marking ground will not be returned on conductor S2. Therefore, switchthrough relay 270 will operate over a connection extending from ground through switchthrough relay 270, normally closed interrupter contacts SM–2, operated contacts **244*a*, normally closed contacts 236 and 224, operated contacts 214 and the lower winding of hunt assist relay 260 to grounded battery. The impedance of the lower winding of hunt assist relay 260 is considerably lower than that of switchthrough relay 270, so that although it is in series with switchthrough relay 270**, the current therethrough is insufficient to effect operation thereof.

In response to the operation of switchthrough relay 270, normally closed contacts 273, 274, 276, 277 and **271*a*** thereof are opened and normally open contacts 271, 272, 275, 278 and 279 thereof are closed. The closure of contacts 271 and 272 provide a direct current loop across trunk circuit 122 over a connection extending from tip conductor T2 through operated contacts 271, secondary windings L22 and L24 of transformers T21 and T22, operated contacts 272 to ring conductor R2. In response to this direct current loop trunk circuit 122 is seized and a connection is extended to operator 124 over the trunk line in the manner previously described. Furthermore, a tone signal is applied to tip conductor T2 over a connection extending from a tone generator conductor through capacitance C25, operated contacts 251 and 271. This tone signal is forwarded to operator 124 to indicate that there is a waiting call. It might be pointed out at this point that a talking path from the calling subscriber is not as yet established, since supervision differential relay 240 is now operated and therefore normally closed contacts 243 thereof are now open.

Nothing further happens until the operator answers. In response thereto an answer supervision signal, consisting of resistance battery, is returned from trunk circuit 122 on the HS conductor, and hunt assist relay 260 is operated over a connection extending from ground through the upper winding of hunt assist relay 260 and operated contacts 278 to the resistance battery on the HS conductor. In response to the operation of hunt assist relay 260, normally open contacts 261, 262 and 263 thereof are closed. The closure of contacts 263 does not, in this case, effect the energization of step magnet SM–1, as described above, since now operated contacts 271*a* are open. The closure of contacts 261 prepares an alternate holding ground for switchthrough relay 200. The closure of contacts 262 provides an energization path for the lower winding of supervision differential relay 240 extending from ground through operated contacts 275, 262 and 242*a* and the lower winding of supervision differential relay 240 to grounded battery.

In response to the energization of the lower winding of supervision differential relay 240, this relay restores. In restoring, contacts 243*a* thereof are reopened, causing tone relay 250 to restore, thereby removing the previously described tone signal from the tip conductor T2. Also, contacts 243 are reclosed and contacts 244 are reopened thereby removing ringback tone from ring conductor R1 and completing a talking path through an A.C. network consisting of the primary windings L21 and L23 of transformers T21 and T22 and capacitance C24, which is shunted by resistance R25. This talking path is further extended by transformer action of transformers T21 and T22 to talking conductors T2 and R2 outgoing to trunk circuit 122.

In response to the opening of contacts 247 and the reclosure of contacts 248 holding ground extended through operated contacts 261 is applied through operated contacts 204 to swiththrough relay 200 to maintain this relay operated.

When the operator is through talking and disconnects, the answer supervision signal on the HS conductor is removed, thereby allowing hunt assist relay 260 to restore. The restoration of hunt assist relay 260 reopens contacts 261 thereof, removing the holding ground for switchthrough relay 200 in intercept line finder 118. Therefore, switchthrough relay 200 restores.

In response to the restoration of swiththrough relay 200, intercept line finder 118 is released in a manner well known in the art.

The reopening of contacts 205 of switchthrough relay 200 breaks the operating path for start relay 210, which restores. In response to start relay 210 restoring, contacts 214 thereof are reopened, breaking the energization path for switchthrough relay 270, which restores. Thus, line finder 118 and trunk finder 120 are now ready to receive another call.

In summary, it will be seen that a plurality of functions, namely, operating the rotary switch, seizing a trunk circuit, establishing a talking path, and releasing the connection, may be performed automatically by operating in a predetermined manner various combinations of supervision differential relay 240, hunt assist relay 260 and switchthrough relay 270, and that this multiple use of these three relays greatly reduces the cost and complexity of the trunk finder circuit.

Although only a preferred embodiment of the present invention has been described herein, it is not intended that the invention be restricted thereto, but that it be limited only by the scope of the appended claims.

What is claimed is:

1. In a telephone system having a plurality of trunks extending to an operator's position, a trunk finder circuit having a stepping switch to be operated to find an idle one of said trunks, a relay, means for intermittently operating said relay in conjunction with said switch to step said switch and find an idle one of said trunks, means for discontinuing the intermittent operation of said relay and to seize the found one of said trunks to extend a calling signal thereover, means to connect an answer supervision signal from the operator's position over said seized trunk to said trunk finder to reoperate said relay, and means responsive to the reoperation of said relay for completing a transmission connection through said trunk finder circuit and trunk to the operator's position.

2. In a telephone system having a plurality of trunks extending to an operator's position, a trunk finder circuit having a stepping switch to be operated to find an idle one of said trunks, first and second relays, means for intermittently operating said first relay in conjunction with said switch to step said switch and find an idle one of said trunks, means for operating said second relay to discontinue the intermittent operation of said first relay and to seize the found one of said trunks to extend a calling signal thereover, means to connect an answer supervision signal from the operator's position over said seized trunk to said trunk finder to reoperate said first relay, and means responsive to the reoperation of said first relay for completing a transmission connection through said trunk finder circuit and trunk to the operator's position.

3. In a telephone system having a plurality of trunks extending to an operator's position, a trunk finder circuit having a stepping switch to be operated to find an idle one of said trunks, first and second relays, means for intermittently operating said first relay in conjunction with said switch to step said switch and find an idle one of said trunks, means for operating said second relay to discontinue the intermittent operation of said first relay and to seize the found one of said trunks to extend a calling signal thereover, means to connect an answer supervision signal from the operator's position over said seized trunk to said trunk finder to reoperate said first relay, means responsive to the reoperation of said first relay for completing a transmission connection through said trunk finder circuit and trunk to the operator's position, and means for releasing said trunk finder responsive to the removal of the answer supervision signal from the operator's position and the consequent restoration of said first relay.

4. In a telephone system having a plurality of trunks extending to an operator's position, a trunk finder circuit having a stepping switch to be operated to find an idle one of said trunks, first, second and third relays, means for intermittently operating said first relay in conjunction with said switch to step said switch and find an idle one of said trunks, means for operating said second relay to discontinue the intermittent operation of said first relay and to seize the found one of said trunks to extend a calling signal thereover, means to connect an answer supervision signal from the operator's position over said seized trunk to said trunk finder to reoperate said first relay, and means including contacts of said third relay and responsive to the conjoint operation of said first and second relays to complete a transmission connection through said trunk finder circuit and trunk to the operator's position.

5. In a telephone system having a plurality of trunks extending to an operator's position, a trunk finder circuit having a stepping switch to be operated to find an idle one of said trunks, first, second and third relays, call extending means including a connector for extending a call to said trunk finder, means for operating said third relay responsive to the seizure of said trunk finder by said call extending means, means for tripping one type of connector ringing prior to the operation of said third relay and for tripping another type of connector ringing after the operation of said third relay, means for intermittently operating said first relay in conjunction with said switch to step said switch and find an idle one of said trunks, means for operating said second relay to discontinue the intermittent operation of said first relay to seize the found one of said trunks to extend a calling signal thereover, means to connect an answer supervision signal from the operator's position over said seized trunk to said trunk finder to reoperate said first relay, and means for releasing said third relay responsive to the conjoint operation of said first and second relays to complete a transmission connection through said trunk finder circuit and trunk to the operator's position.

References Cited in the file of this patent

UNITED STATES PATENTS

| | | |
|---|---|---|
| 1,588,437 | Bailey | June 15, 1926 |
| 1,697,623 | Willis | Jan. 1, 1929 |
| 1,991,170 | Newsom | Feb. 12, 1935 |
| 2,375,136 | Rhoads | May 1, 1945 |
| 2,379,456 | Rhoads | July 3, 1945 |
| 2,409,164 | Taylor | Oct. 8, 1946 |
| 2,598,098 | Balzer | May 27, 1952 |
| 2,715,160 | Pharis | Aug. 9, 1955 |
| 2,764,636 | Gray | Sept. 25, 1956 |